Aug. 20, 1968  R. A. HANSON  3,397,470
EXCAVATOR

Filed Oct. 8, 1965  5 Sheets-Sheet 3

INVENTOR.
RAYMOND A. HANSON
BY
*Wells & St.John*
ATTYS.

Aug. 20, 1968    R. A. HANSON    3,397,470
EXCAVATOR
Filed Oct. 8, 1965    5 Sheets-Sheet 4
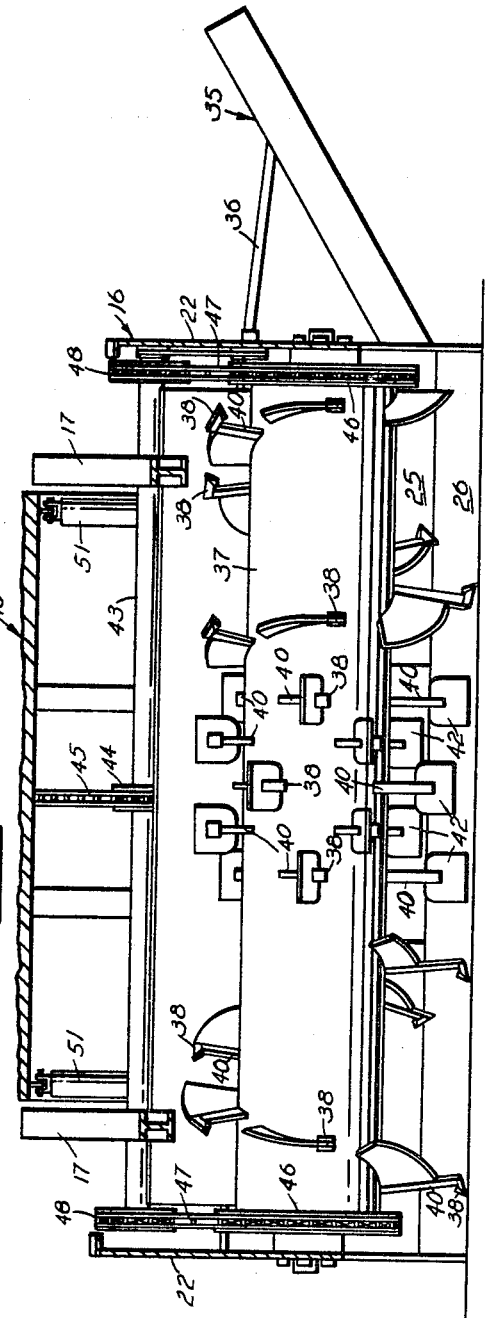
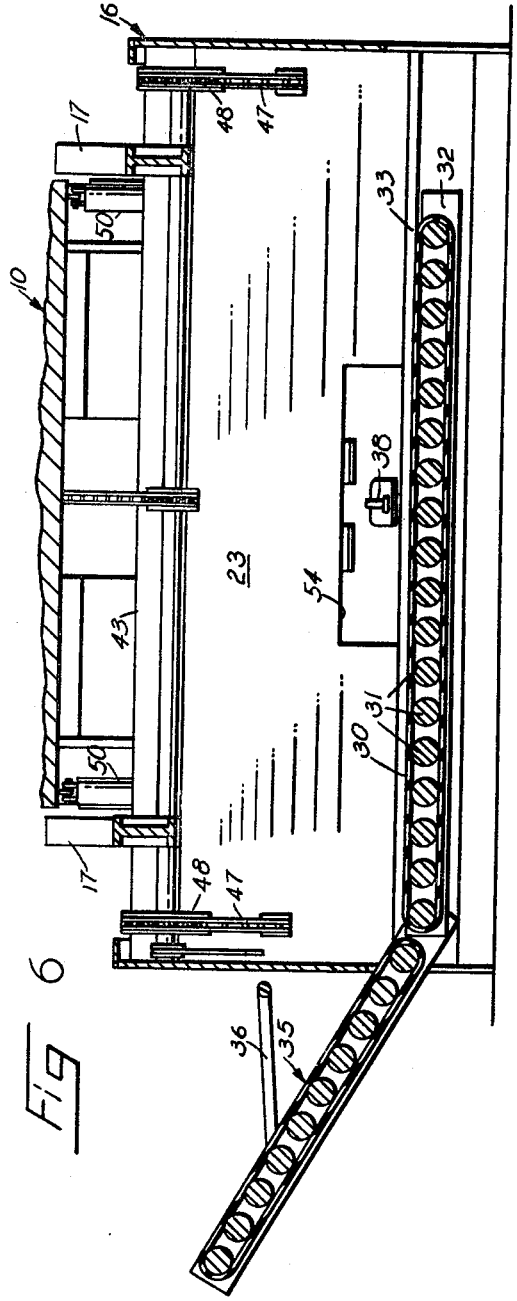
INVENTOR.
RAYMOND A. HANSON
BY
ATTYS.

Aug. 20, 1968   R. A. HANSON   3,397,470
EXCAVATOR
Filed Oct. 8, 1965   5 Sheets-Sheet 5
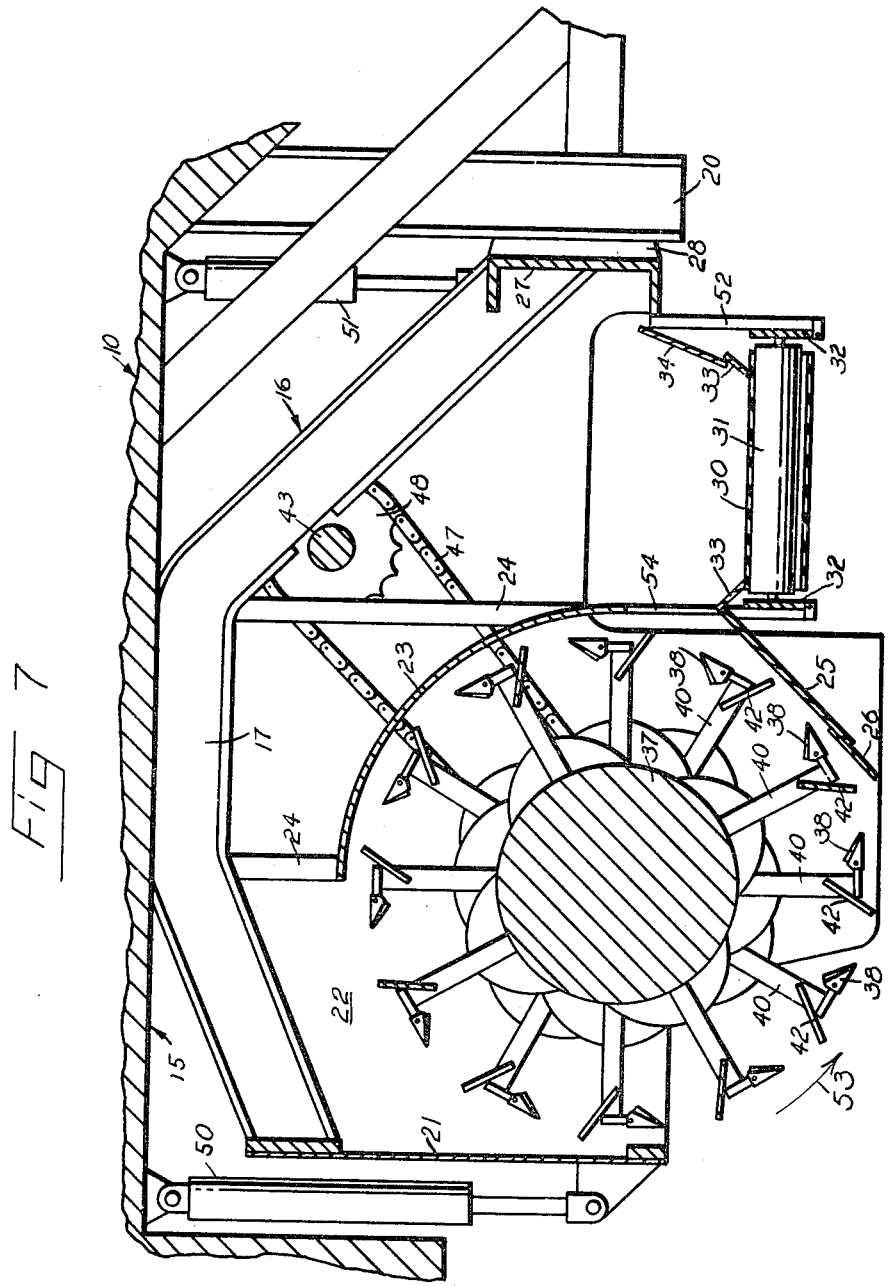
INVENTOR.
RAYMOND A. HANSON
BY
*Wells & St.John*
ATTYS.

United States Patent Office 3,397,470
Patented Aug. 20, 1968

3,397,470
EXCAVATOR
Raymond A. Hanson, % R. A. Hanson Company,
Palouse, Wash. 99161
Filed Oct. 8, 1965, Ser. No. 494,092
3 Claims. (Cl. 37—108)

ABSTRACT OF THE DISCLOSURE

An excavator for cutting soil materials to a sub-grade elevation. The apparatus involves the use of a mobile supporting framework and elevationally adjustable frame on which is mounted a transverse rotational shaft. The shaft is equipped with projecting cutting teeth and distributing auger blades, which cooperate to loosen and convey excess material toward the transverse center of the shaft. The frame further carries a trimming blade immediately rearward of the teeth and an enclosure or shield rearward of the teeth. The transverse center portion of the shaft is further provided with paddles which direct loosened material through an aperture in the enclosure to a receiving conveyor rearward thereof.

This invention relates to a high speed excavator for cutting to a subgrade elevation along a longitudinal right of way, such as along a proposed street or highway.

The machine disclosed herein is devised to excavate and handle large quantities of soil while digging several inches below existing grade to accurately define a subgrade during highway preparation. The apparatus combines a digging and trimming auger with a high capacity conveying system to move soil removed thereby to the side of the grade being cut.

It is a first object of this invention to provide an excavating apparatus which is adjustable and therefore readily adaptable to automatic grade controls. While the excavating apparatus is mounted on a large supporting mobile framework, it is completely adjustable relative to that framework so that it can be mechanically held to grade by controlling movement thereof relative to the framework.

Another object of this invention is to combine a novel auger arrangement together with a high capacity transverse conveyor which is effective to carry soil to the side of the machine after being excavated.

Another object of this invention is to provide a machine which spreads soil transversely across the excavating member so as to fill any voids that might be encountered along the proposed subgrade surface.

These and further objects will be evident from the following disclosure, taken in conjunction with the accompanying drawings, which illustrate one preferred form of the invention. It is to be understood that this form of the invention is only an example thereof, and is not intended to restrict the scope of the appended claims.

Figure 1:
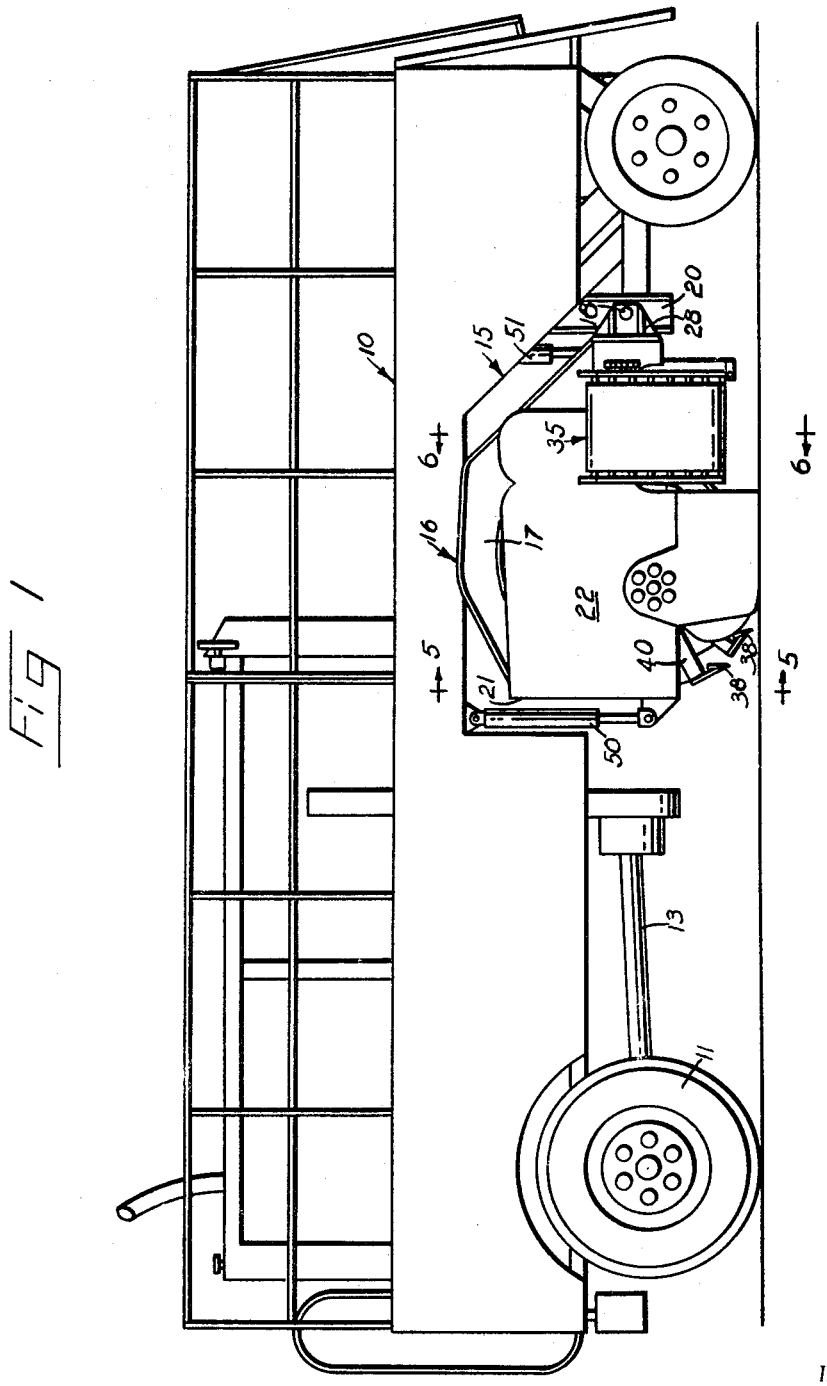
Figure 2:
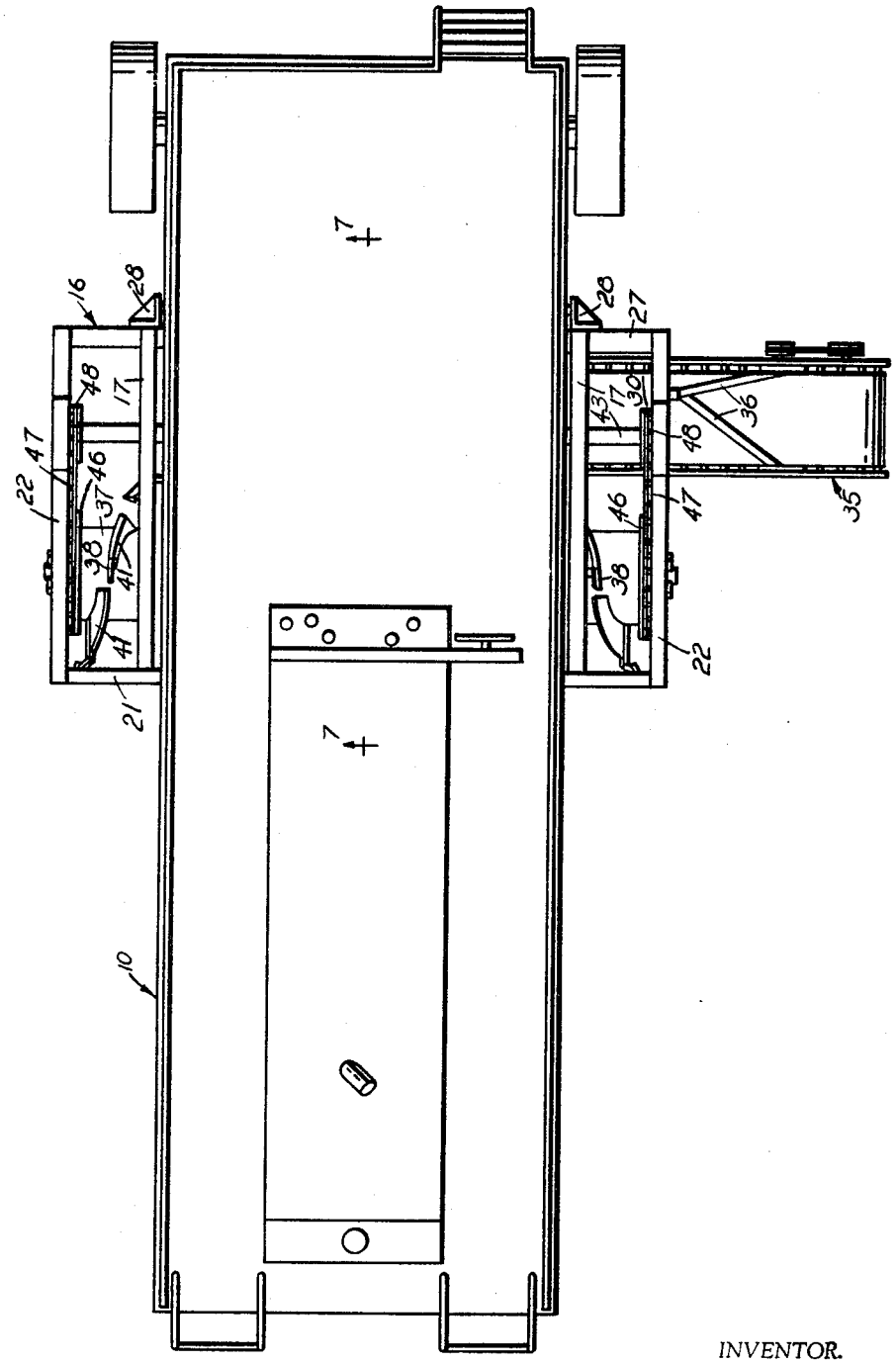
Figure 3:
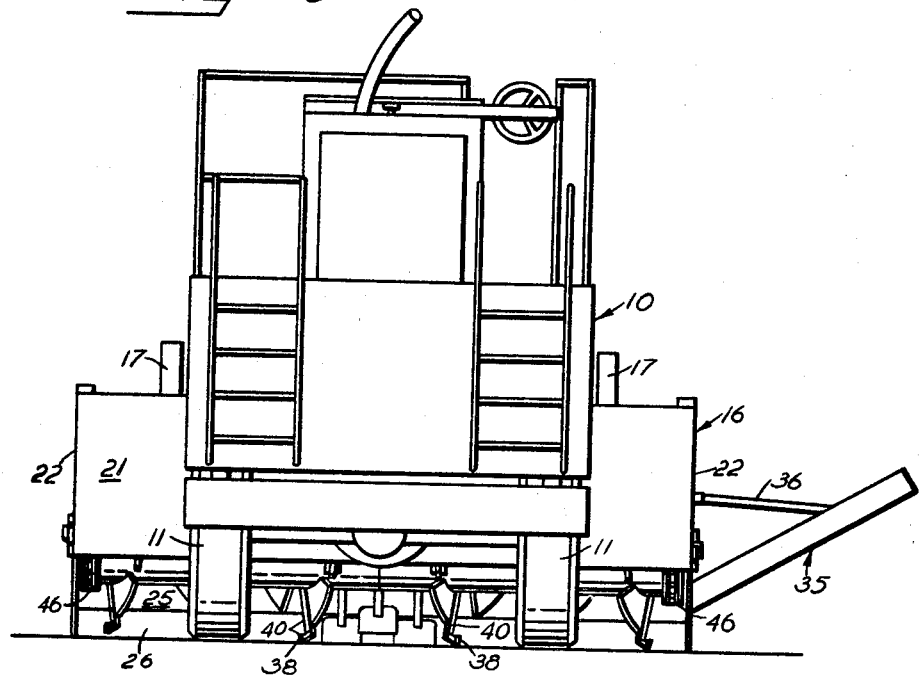
Figure 4:
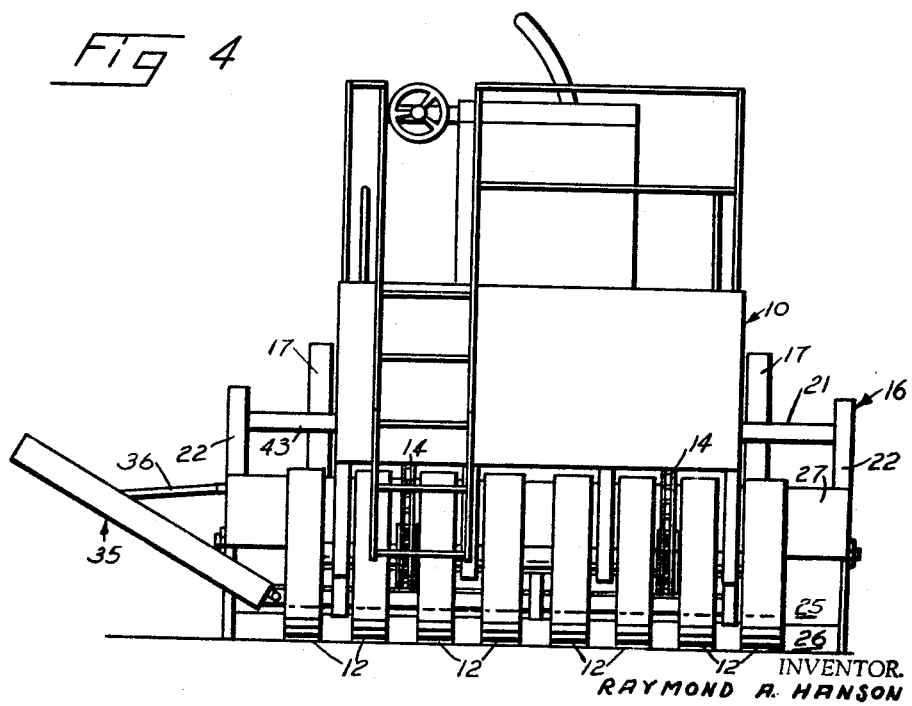

In the drawings:
FIGURE 1 is a side elevation view of the apparatus;
FIGURE 2 is a top plan view of the apparatus shown in FIGURE 1;
FIGURE 3 is a front elevation view of the apparatus shown in FIGURE 1;
FIGURE 4 is a rear elevation view of the apparatus shown in FIGURE 1;
FIGURE 5 is a fragmentary vertical sectional view taken at an enlarged scale along line 5—5 in FIGURE 1;
FIGURE 6 is a view similar to FIGURE 5, but taken along line 6—6 in FIGURE 1; and
FIGURE 7 is an enlarged fragmentary sectional view taken through the excavating apparatus substantially along line 7—7 in FIGURE 2.

In referring to the machine shown in the drawings, reference will be made to the front and the rear of the machine relative to the intended direction of movement of the machine during operation. In FIGURE 1 the front of the machine is shown to the left and the rear of the machine is shown to the right.

The mobile apparatus for excavating a highway subgrade is shown carried by a substantial rigid framework 10. Framework 10 is supported by the soil beneath it by means of front wheels 11 which ride on the existing grade and rear wheels 12 which ride on the grade as excavated. The rear wheels 12, as shown in the drawings, are compacting wheels spaced along the rear width of the machine. Other types of compacting wheels or mechanisms can obviously be substituted.

The basic drive mechanism for wheels 11 and 12 is not shown in detail. The main engine 9 is used to drive the front wheels 11 through a common drive shaft 13, and the rear wheels 12 are powered by rear drive chains 14 (FIGURE 4). The front wheels 11 are used for steering purposes, either by varying the relative drive speed ratio between them or by mechanically turning wheels 12, using conventional steering devices.

Framework 10 is provided with an open arched section toward its rear, the arched section being unobstructed in a transverse direction. Beneath this arched section, generally designated as 15, is movably mounted, the excavating apparatus. Framework 10 as illustrated is designed to carry other devices beneath arched sections 15 depending upon the particular use of the machine.

The excavating apparatus is movably supported relative to framework 10 on a frame generally designated as 16. Frame 16 comprises a heavy cross channel 27 (FIGURE 7) which is braced against framework 10 by means of rear brackets 28 at the respective sides of framework 10. The brackets 28 carry rollers which are rotatably mounted about transverse roller axles 18 and which engage a vertical I-beam 20 fixed to the framework 10. The pushing force transmitted to frame 16 from framework 10 is transmitted between the I-beam 20 and the respective rollers at each side of frame 16. The purpose of the rollers is to transmit the pushing force only, while providing for vertical adjustment of the frame 16 relative to framework 10.

Frame 16 has two heavy arched supports 17 at each side thereof which extend rigidly from their connections with the channel 27. The supports 17 carry a vertical front wall 21 that extends transversely across framework 10. Frame 16 is defined at its outer ends by vertical end walls 22 which close the outer ends of the front walls 21. Beneath the arched supports 17 is supported an arcuate shield 23, which is made of solid sheet material. The shield 23 is carried by vertical rigid braces 24 which extend to the arched supports 17. The lower edge of shield 23 carries a forwardly and a downwardly extending blade 25 which terminates along a replaceable lower edge member 26. The bottom of the lower edge member 26 defines the cutting depth of the excavating apparatus.

Immediately rearward of shield 23 is a conveyor including a conventional flexible endless conveyor belt 30. Belt 30 has an upper working flight supported by longitudinally spaced rollers 31 rotatably carried on transverse side supports 32 (FIGURE 6). The side supports 32 are carried by vertical braces 24 and by rear braces 52 that are fixed to the channel 27 (FIGURE 7). The upper flight of conveyor belt 30 is mounted along its front and rear edges by upwardly extending side plates 33, which assist in directing soil onto the upper flight of belt 30. A fixed backstop 34 is provided at the rear edge of conveyor belt 30 (FIGURE 7).

The horizontal conveyor discharges onto an upwardly extending transverse conveyor 35 which is braced relative to frame 16 by suspending rods 36. Material placed upon the upper flight of conveyor belt 30 is carried to the conveyor 35 and discharged outwardly beyond framework 10. The conveyor belts are powered by any suitable device, such as a direct mechanical connection to the engine 9 or an indirect connection by means of hydraulic pumps and motors.

Rotatably mounted between the end walls 22 under the shield 23 is a transverse auger shaft 37. Fixed to shaft 37 are a series of teeth 38 arranged in a spiral pattern and supported by rigid shanks 40. The outer end sections of shaft 37 have auger segments 41 which are located on shaft 37 directly rearward of the respective shanks 40 in the intended direction of rotation of shaft 37 (the intended direction of rotation is indicated by arrow 53 in FIGURE 7). The spiral pattern at the respective ends of shaft 37 is such as to allow the auger segments 41 to move soil contacted thereby toward the center of the frame 16.

At the center of frame 16, shanks 40 for teeth 38 are provided with paddles 42 which are perpendicular to the rotational direction of movement of teeth 38. Paddles 42 scoop soil contacted thereby and push it rearwardly over the upper surface of blade 25. An open aperture 54 is provided in shield 23 rearward of the teeth provided with paddles 42, so that soil can be discharged from paddles 42 onto the upper flight of converoy belt 30. It is to be noted that the outer peripheries of the moving teeth 38 and paddles 42 are substantially at the same elevation as the lower surface of the lower edge member 26 on blade 25. Also, the blade 25 is closely adjacent to the paddles 42 so that substantially all of the soil contacted by panels 42 will be pushed upwardly along the blade 25 and through aperture 54.

Shaft 37 is powered by means of an idler shaft 43 rotatably mounted by the arched supports 17. A driven sprocket 44 at the center of shaft 43 is powered by a chain 45 which extends upwardly to framework 10 (FIGURES 5 and 6). Chain 45 is powered from the main engin 9 of the machine. Suitable provision is made for allowance of movement between the framework 10 and frame 16 so that the chain 45 will continually rotate shaft 43.

Shaft 37 is powered by end sprockets 46 (FIGURE 5) turned by means of chain 47 at each of the respective ends of idler shaft 43. Chains 47 are entrained about driving sprockets 48 on the shaft 43.

The elevational position of frame 17 relative to framework 10 is adjustable by means of two front hydraulic cylinders 50, located respectively at the sides of framework 10 and connected between framework 10 and the lower edge of front wall 21 on frame 16. The rear end of frame 16 is positioned by means of two cylinders 51 (FIGURE 7) respectively mounted at the sides of framework 10 and connected between framework 10 and the upper surface of cross channel 27. The individual cylinder assemblies 50, 51 are independently operable to provide complete elevational adjustment between frame 16 and framework 10. The use of hydraulic cylinder assemblies enables the apparatus to be readily adapted to automatic grade controls.

The drawings illustrate the machine with the lower surface of blade 25 and corresponding lower peripheral elevations of teeth 38 at an elevation common to the bottom tangential positions of wheels 11 and 12. In use, during excavation of a highway right of way, the lower surfaces of blade 25 and teeth 38 will be beneath the elevation of the front wheels 11. The rear wheels 12 will ride on the grade cut by the blade 25.

The apparatus described is designed to grade an earth surface while scrapers and conventional equipment are making final cuts. It can spread, trim and partially compact the base courses of a highway, one lane at a time, conveying excess material to the next lane to eliminate waste. It can be used to excavate native soil or to excavate along a cement treated base. The framework 10 can readily tow a pneumatic or steel roller attachment for additional compaction. If compacting wheels such as shown in the drawings are used as the rear wheels 12, the machine normally will tow a trailer with additional compacting wheels placed alternately to the positions of the wheels 12 on framework 10. The wide opening at the center of the machine for soil reception provided by aperture 54 insures a high capacity for soil removal by the paddles 42 and the conveyor belt 30. The apparatus has complete adjustment by means of the independent cylinders 50, 51, while providing a positive pushing connection between frame 16 and framework 10 through the rollers carried on brackets 28.

Various equivalent devices can be substituted in this combination without deviating from the basic concept, and therefore only the following claims are submitted as restrictive definitions on the scope of this invention.

Having thus described my invention, I claim:

1. An excavator for cutting a soil surface to grade, comprising:

a mobile supporting framework carried by ground engaging members;

a conveyor on said framework, said conveyor having a working flight extending transversely outward beyond one side of said framework;

and transverse digging means mounted on said framework forward of said conveyor to loosen soil at a given elevation relative to said framework and to deposit the soil so loosened on the conveyor, said digging means comprising:

(a) a shaft rotatably mounted on said framework for motion about a transverse axis;

(b) drive means on said framework operatively connected to said shaft to rotate said shaft about said axis;

(c) a plurality of radial digging teeth fixed to said shaft for rotation therewith, said teeth being spaced longitudinally along the length of said shaft;

(d) auger blades fixed to said shaft and extending outwardly therefrom a distance less than the extension of said teeth relative to said shaft axis, said blades being oriented to move soil contacted thereby toward the transverse center of said framework when said shaft is rotated by said drive means;

(e) a soil engaging blade mounted on said framework immediately rearward of said teeth, said blade having a downwardly and forwardly projecting front surface extending along the full length of said shaft, the lower edge of said blade being substantially equal in elevation to the lowermost surfaces of said digging teeth when the teeth are rotated about said shaft axis;

(f) and a plurality of axial paddles fixed relative to said shaft at the central portion thereof to move soil contacted thereby over said blade and onto said conveyor;

said excavator further comprising a common supporting frame movably mounted on said framework for elevational adjustment relative thereto, said frame being movably supported on said mobile framework for elevational adjustment relative thereto, said digging means being carried on said frame;

and a rear enclosure mounted on said frame immediately rearward of the digging teeth on said shaft, said enclosure extending upwardly and forwardly from the upper edge of said blade to a position above said shaft, said enclosure benig provided with an aperture formed therethrough immediately above said blade and located rearward of said paddles on said shaft.

2. An apparatus as defined in claim 1 wherein said frame further comprises:

rollers at each side thereof engaged at their rear by vertical surfaces on said supporting framework;

and front and rear supporting cylinder assemblies operatively connected between said framework and said frame individually operable to selectively vary the elevational position of said digging means and conveyor relative to said framework.

3. An excavator for cutting a soil surface to grade, comprising:

a mobile supporting framework carried by ground engaging members;

a transverse frame movably mounted on said framework for elevational adjustment relative thereto;

power operated means operatively connected between said framework and said frame for elevationally positioning said frame relative to said framework;

a shaft transversely mounted on said frame for rotation of said shaft about its central axis;

a plurality of radial digging teeth fixed to said shaft for rotation therewith, said teeth being spaced longitudinally along the length of said shaft;

auger blades fixed to said shaft and extending outwardly therefrom a distance less than the extension of said teeth relative to said shaft axis, said blades being oriented to move soil contacted thereby toward the transverse center of said framework when that shaft is rotated;

an enclosure extending across the full width of the shaft, said enclosure being carried on said frame at a position rearwardly adjacent to the teeth on said shaft, the lower portion of said enclosure being a rigid blade having a downwardly and forwardly projecting front surface and a planar bottom edge, the bottom edge of said blade being substantially equal in elevation to to the lowermost positions of said digging teeth when rotated about said axis;

a plurality of axial paddles mounted on said shaft at the transverse central portion thereof;

said enclosure having an aperture formed therethrough above said blade along the transverse central portion of said enclosure and rearward of said paddles;

and conveyor means rearward of said enclosure for receiving material directed thereupon through the enclosured aperture.

References Cited

UNITED STATES PATENTS

| 535,028 | 3/1895 | Straw | 37—102 |
| 2,780,046 | 2/1957 | Edwards | 56—208 X |
| 3,044,753 | 7/1962 | Wilcox | 299—68 |
| 3,072,391 | 1/1963 | McDarrah | 299—39 |
| 3,245,159 | 4/1966 | MacDonald | 37—101 |
| 3,314,175 | 4/1967 | Petty et al. | 37—108 |

FOREIGN PATENTS

| 207,023 | 3/1957 | Australia. |

ABRAHAM G. STONE, *Primary Examiner.*

A. E. KOPECKI, *Assistant Examiner.*